(12) United States Patent
Beightol et al.

(10) Patent No.: US 8,233,393 B2
(45) Date of Patent: *Jul. 31, 2012

(54) SYSTEM FOR TRANSMITTING HIGH QUALITY SPEECH SIGNALS ON A VOICE OVER INTERNET PROTOCOL NETWORK

(75) Inventors: Dean David Beightol, Superior, CO (US); Paul R. Michaelis, Louisville, CO (US)

(73) Assignee: Avaya Inc., Basking Ridge, NJ (US)

( * ) Notice: Subject to any disclaimer, the term of this patent is extended or adjusted under 35 U.S.C. 154(b) by 919 days.

This patent is subject to a terminal disclaimer.

(21) Appl. No.: 12/188,355

(22) Filed: Aug. 8, 2008

(65) Prior Publication Data
US 2008/0298349 A1 Dec. 4, 2008

Related U.S. Application Data

(62) Division of application No. 10/777,933, filed on Feb. 12, 2004, now Pat. No. 7,457,242.

(51) Int. Cl.
*H04J 1/16* (2006.01)
(52) U.S. Cl. .......................... 370/235; 370/352; 714/748
(58) Field of Classification Search .................. 370/216, 370/230–235, 352, 465–467; 714/748
See application file for complete search history.

(56) References Cited

U.S. PATENT DOCUMENTS

| | | | |
|---|---|---|---|
| 4,791,660 A | 12/1988 | Oye et al. | |
| 5,506,872 A | 4/1996 | Mohler | |
| 6,807,150 B1 | 10/2004 | McNiff et al. | |
| 7,233,573 B2 * | 6/2007 | Walls et al. | 370/236 |
| 7,502,317 B2 * | 3/2009 | Joshi et al. | 370/230 |
| 2001/0040872 A1* | 11/2001 | Haglund | 370/235 |
| 2002/0027880 A1 | 3/2002 | Mesiwala | |
| 2002/0056005 A1* | 5/2002 | Weik | 709/228 |
| 2003/0026275 A1 | 2/2003 | Lanzafame et al. | |
| 2003/0133408 A1 | 7/2003 | Cheng et al. | |
| 2004/0001224 A1* | 1/2004 | Kajiwara | 358/1.15 |
| 2004/0017806 A1 | 1/2004 | Yazdy et al. | |
| 2004/0057456 A1 | 3/2004 | He et al. | |
| 2004/0151158 A1* | 8/2004 | Gannage et al. | 370/351 |
| 2005/0047402 A1 | 3/2005 | Bostrom et al. | |

OTHER PUBLICATIONS

Official Action for U.S. Appl. No. 10/777,933, mailed Feb. 6, 2008, 23 pages.
Notice of Allowance for U.S. Appl. No. 10/777,933, mailed Aug. 4, 2008, 8 pages.

* cited by examiner

*Primary Examiner* — Ricky Ngo
*Assistant Examiner* — Kan Yuen
(74) *Attorney, Agent, or Firm* — Sheridan Ross P.C.

(57) ABSTRACT

The VoIP quality speech process is activated when a subscriber accesses a speech quality sensitive resource or in response to an activation of the feature by the subscriber, or when it is determined that the originating subscriber terminal device requires the transmission of high quality speech signals. A transmit buffer, associated with the port circuit that serves the originating device, stores a predetermined number of packets as they are transmitted from the originating device. In the case of lost or damaged packets, the VoIP quality speech system activates the transmit buffer to retransmit the missing or damaged packet to the destination device. Intelligent buffer management is provided, where the destination device can regulate the size of the transmit buffer as well as the size of its jitter buffer.

15 Claims, 2 Drawing Sheets

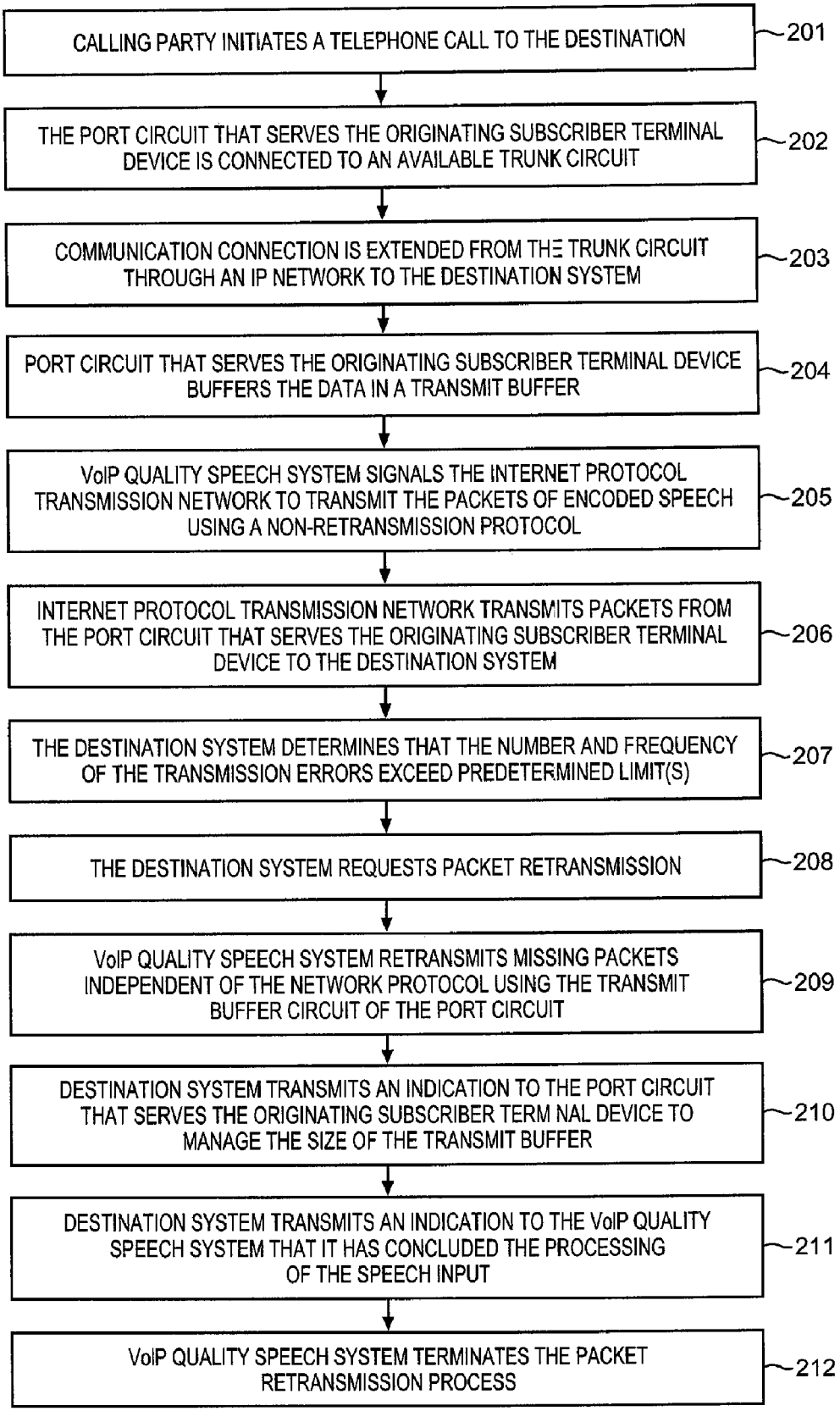

SYSTEM FOR TRANSMITTING HIGH QUALITY SPEECH SIGNALS ON A VOICE OVER INTERNET PROTOCOL NETWORK

CROSS-REFERENCE TO RELATED APPLICATIONS

This application is a divisional of U.S. patent application Ser. No. 10/777,933 filed Feb. 12, 2004.

FIELD OF THE INVENTION

This invention relates to an Internet Protocol Network and a system that transmits high quality speech signals over this network for selected applications.

BACKGROUND OF THE INVENTION

It is a problem in the field of Internet Protocol Networks that some of the data packets may fail to arrive at their intended destination. Transmission protocols such as TCP/IP permit receiving devices to request that missing packets be retransmitted; unfortunately, this retransmission process often results in long pauses in the data stream, as well as data transmission latencies of more than several hundred milliseconds, thereby rendering schemes such as TCP/IP inappropriate for most telephony applications.

For these reasons, Voice over Internet Protocol (VoIP) systems commonly use a transmission scheme called User Datagram Protocol, or UDP. This mechanism does not suffer from the pauses or transmission latencies that would be seen if TCP/IP were used for VoIP, chiefly because, unlike TCP/IP, there is no retransmission of missing packets. Instead, IP networks often try to reduce VoIP packet loss by assigning a higher priority (commonly referred to as Quality of Service or QoS) to UDP packets. Concurrently, many VoIP telephones incorporate packet loss concealment algorithms that try to trick the human ear by replacing the missing packet with data that is extrapolated from the data received or with data that is commonly referred to as "comfort noise."

Unless the level of packet loss becomes extreme (on the order of 5% or greater, depending on the audio encoding algorithm being used), the use of high quality packet loss concealment algorithms allows UDP to be an acceptable transmission protocol for person-to-person voice conversations. This is because it is relatively easy to trick the human ear into hearing something that isn't there. Unfortunately, the packet loss concealment algorithms of the present art do not mitigate the deleterious effects of packet loss on many accuracy-sensitive applications for which voice channels (and therefore UDP) are commonly used; examples include automatic speech recognition systems, automatic speaker identification systems, and the TTY/TDD communication commonly employed by people with hearing deficits.

It is of interest to note that applications such as these, which tend to be very sensitive to the effects of packet loss, tend not to be especially sensitive to the effects of latency. Illustratively, point-to-point transmission delays on the order of half a second would be unacceptable in a voice conversation between two people, but would probably not be noticeable in a TTY/TDD conversation, or when an individual is speaking commands to a typical automatic speech recognition system. In other words, these are applications for which it would make sense to accept a greater degree of latency in exchange for reduced packet loss.

A superficial analysis of this problem might cause one to conclude that the use of TCP/IP for these applications, rather than UDP, might be a reasonable solution. Although the use of TCP/IP would provide for the retransmission of missing packets, there are other considerations that render this approach impractical. Reasons include:

(1) Transitioning back and forth between TCP/IP and UDP on the same call would be difficult to support from an engineering standpoint, and is not even permitted within existing Internet standards. An example of where this might be needed would be a call in which one of the parties is hearing-impaired, but not deaf; these individuals often prefer to intermix voice and TTY/TDD on the same call.

(2) The adding of a resource that requires TCP/IP to a pre-existing UDP connection would be difficult to support from an engineering standpoint, and is not even permitted within existing Internet standards. An example of this type of situation would be a telephone conversation between two people, in which an automatic speech recognition resource is added to the call.

(3) There is no mechanism within TCP/IP to ensure that the transmission pauses, while waiting for retransmitted packets to arrive, occur in places where they will do no harm to an audio stream (e.g., between spoken words, rather than within a word, or between TTY characters, rather than within a character).

(4) If audio packets are tagged as TCP/IP, rather than UDP, VoIP QoS mechanisms within the Internet may fail to classify these as high priority packets, thereby exacerbating the packet loss problem even further.

These and other problems are addressed by the disclosures contained herein.

BRIEF SUMMARY OF THE INVENTION

The above-described problems are solved and a technical advance achieved by the present system for transmitting high quality speech signals on a Voice over Internet Protocol Network, termed VoIP quality speech system. This VoIP quality speech system selectively activates a speech transmission mode that tolerates transmission delays of several hundred milliseconds, since these delays are not noticeable in many applications, especially those where the speech transmissions are one way in nature. For applications where speech quality is of paramount importance, then speed is sacrificed in this mode, and the associated Internet Protocol Network is activated to automatically adjust its encoding and transmission characteristics for these applications. For example, voice and TTY speech signals are encoded in a high quality format and at no point would the Internet Protocol Network transcode the encoded speech into a lower quality format. The buffering and transmission characteristics of this connection are adjusted to ensure that no data packets are lost or assembled out of order.

The VoIP quality speech process can be automatically or manually activated in response to a subscriber accessing a speech quality sensitive resource or in response to an activation of the feature by the subscriber, or when it is determined that the originating subscriber terminal device requires the transmission of high quality speech signals. In order to address the case of lost or damaged packets, the VoIP quality speech system activates a transmit buffer in the port circuit of the originating system to store the encoded data received from the transmitting device as it is being output to the network. The transmit buffer can then retransmit missing or damaged packets.

The size of the transmit buffer can be controlled by the signals received from the destination system and/or by the network. For example, a speech recognition engine can generate a confidence level, which measure can be returned to the transmitting device to enable the port circuit that serves the transmitting device to dynamically allocate transmit buffer resources. In addition, the packets are time stamped and the difference between the present time and the time stamp on a received packet is an indication of the network delay, which indication can be used by the destination system or the network to control the size of the transmit buffer. The destination system can monitor receipt of packets in the jitter buffer to thereby determine in advance of the need for the missing packet to pause the processing of received packets, such as at a rational break in the transmission stream—between words, during pauses, between characters in a TTY transmission, etc. When the need for the high quality speech signals is satisfied and the continuing communications on the call connection can be satisfied by the speed optimized processing of the speech signals, the VoIP quality speech feature can be disabled and the quality speech processing resources released, since the underlying network is by default speed optimized.

BRIEF DESCRIPTION OF THE DRAWINGS

FIG. 2 illustrates in flow diagram form the operation of the present VoIP quality speech system in a typical call scenario.

DETAILED DESCRIPTION OF THE INVENTION

Figure 1:
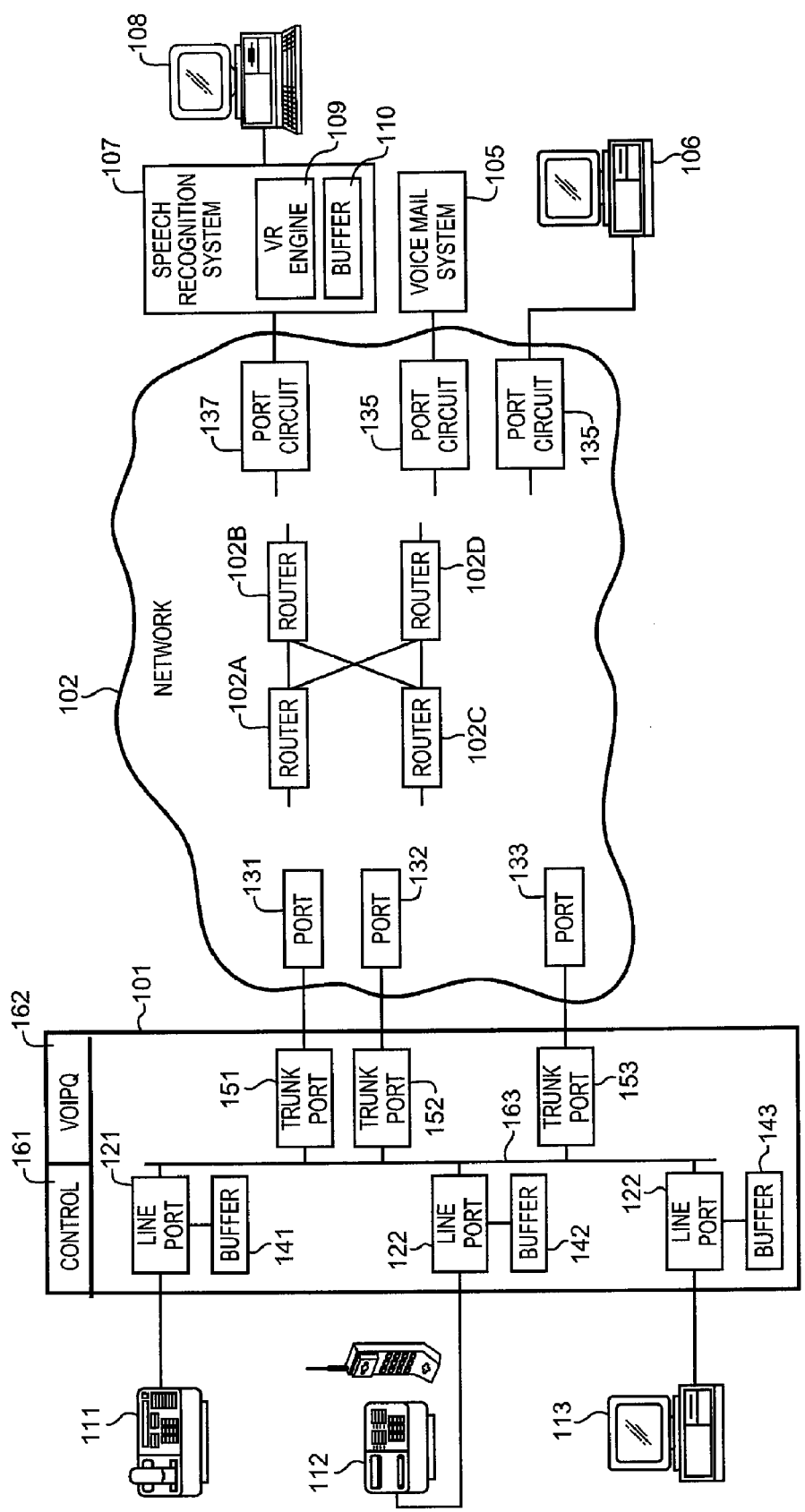
FIG. 1 illustrates in block diagram form the overall architecture of the present VoIP quality speech system and a typical environment, including a Voice over Internet Protocol Network, in which it is operational.

FIG. 1 illustrates in block diagram form the overall architecture of the present VoIP quality speech system 142 and a typical environment, including a Voice over Internet Protocol (VoIP) Network 102, in which it is operational. The Internet is an example of an Internet Protocol Network 102 consisting of many computers located all over the world, which are connected through many telephone systems and other means. The Internet uses a network protocol termed Transmission Control Protocol/Internet Protocol (TCP/IP). The computers connected to the Internet use TCP/IP to exchange data with other computers that are connected to the Internet. TCP is a packet switched network protocol that breaks down the message to be sent into smaller portions of data termed packets. Each data packet is provided with the data address of both the sender and receiver of the message as well as a sequence number that identifies where in the sequence of packets this packet belongs.

In a typical telecommunications network environment, the TCP/IP protocol is used to transfer the data from the originating device to the destination system over the Internet by transmitting each packet for a port circuit 131-133 that serves the originating device through a series of routers 102A-D to a port circuit 135-135 that serves the destination system, where the routers 102A-D dynamically interconnect the originating device to the destination system. Each router, such as router 102A, that receives a data packet examines the destination address and forwards the packet to the next router, such as router 102D, in the Internet Protocol Network 102 to advance the transmission of the data packet to the destination system. This process continues until the data packet reaches the destination system.

The individual data packets are reassembled at the destination system using TCP to reconstruct the original message. The data packets can arrive out of order at the destination system, since each data packet is dynamically routed by the Internet Protocol Network 102 and likely traverse different paths, each with its own delay characteristics. Thus, the unique label assigned to each data packet is necessary to ensure that the data packets which comprise the components of the original message are assembled in the proper order. If the destination system determines that an individual data packet contains an error or a data packet is missing from the message, it can request the originating device to retransmit the data packet that was identified as either erroneous or missing.

The expectations with the use of the TCP-IP protocol is that there is an existing data file resident at the originating device, so there is no need for a buffer at the originating device, since the entirety of the file is available at all times during the transmission to retrieve data for retransmission. Thus, the TCP/IP process ensures accurate, although not real-time, transmission of data from an originating device to a destination system, since the received data must be buffered until the completeness of the received data is assured.

In the system illustrated in FIG. 1, a plurality of subscriber terminal devices 111-113 are served by a switching system, such as a Private Branch eXchange (PBX) 101 (or other local switching office) which interconnects the subscriber terminal devices 111-113 with a plurality of trunks 131-133 located in Internet Protocol Network 102 via a switching network 163 pursuant to the operational signals generated by controller 161. The PBX 101 is equipped with a plurality of line port circuits 121-123, each of which serves a corresponding one of the plurality of subscriber terminal devices 111-113 and a plurality of trunk port circuits 151-153, each of which serves to connect PBX 101 to a corresponding one of the trunks 131-133 located in Internet Protocol Network 102. Each line port circuit 121-123 is also equipped with a transmission buffer 141-143 to store a predetermined and optionally controllable amount of data packets. The VoIP quality speech system 162 and the transmit buffers 141-143 are shown as being resident in the PBX 101, although their location can be elsewhere in the Internet Protocol Network 102 or in the interconnected devices shown in FIG. 1.

The Internet Protocol Network 102 includes port circuits 135-137, each of which serves one of a plurality of destination systems 105-107, which are shown as speech-based systems that use the Internet Protocol Network 102 for delivering speech signals from a source subscriber terminal device. Examples of destination systems 105-107 include, but are not limited to: a speech recognition system 107 (which includes a speech recognition engine 109) that serves a processor 108, voice mail system 105, TTY communications (Telecommunication Device for the Deaf device 106, and the like.

In each of these cases, the destination system or its associated port circuit 135-137 includes a jitter buffer, such as jitter buffer 110, that functions to smooth out variance in the data transmission speed by storing a small amount of the data as it is received before it is needed by the destination system to account for minor variations in the data transmission speed. The jitter buffer also enables the destination system to assemble a string of packets that are received out of order. However, where the delays in the transmitted data become large, the jitter buffer cannot compensate for these delays and the delays are noticeable. If the destination system is a unidirectional speech quality sensitive device, the use of a large jitter buffer solves the delay part of the problem, but cannot address the instance of missing packets.

The packets that are transmitted through an Internet Protocol Network 102 can be lost or damaged in the routing through the network. Since the packet-based Internet Protocol Network 102 dynamically routes each packet, there is no guarantee that the packet reaches the destination system in the proper order or even reaches the destination system. Since the path through the Internet Protocol Network 102 varies, the only point at which the packetized data can be stored with assurance is in the originating port circuit or the originating device. To accurately reconstitute the missing packet, the originally encoded packets must be buffered so that retransmission of the missing packet can occur. This can be done, for example, in the originating PBX 101 where the port circuit 121-123 serving the subscriber terminal equipment 111-113 can be equipped with a transmit buffer 141-143 (alternatively, the port circuits 131-133 can be equipped with a transmit buffer). The transmit buffers 141-143 store a predetermined quantity of packets where the contents of the transmit buffer 141-143 can automatically be aged, such that a predetermined quantity of the encoded speech packets are stored, with each successively received packet causing the oldest stored packet to be discarded. In addition, the retransmission scheme can be originated only after a predetermined number or frequency of errors is detected.

Processing of a Call Origination

FIG. 2 illustrates in flow diagram form the operation of the present VoIP quality speech system 162 and its associated transmit buffers 141-143 and jitter buffers 110. The subscriber (calling party) at a typical digital subscriber terminal device, such as 111, initiates a telephone call at step 201 in a standard manner to a destination device, such as the processor 108. In response to the call initiation, controller 161 activates switching network 163 in PBX 101 to interconnect the port circuit 121 that serves the subscriber terminal device 111 with an available trunk circuit 152 at step 202. This communication connection is extended at step 203 through IP Network 102 to the destination, such as speech recognition system 107 that is also served by IP Network 102. The speech recognition system 107 includes a speech recognition engine 109 that analyses received speech signals to determine whether the calling party at subscriber terminal device 111 is authorized to access the protected processor 108 that is served by or part of speech recognition system 107. Voice quality is especially critical for proper operation of the speech recognition engine 109 that is located in the speech recognition system 107, since the precise determination of speech characteristics of the subscriber is essential to the speech recognition function.

The VoIP quality speech process 162 is activated in response to a one of: a subscriber accessing a speech quality sensitive resource, such as speech recognition system 107, or in response to an activation of the feature by the subscriber, or when it is determined that the originating subscriber terminal device requires the transmission of high quality speech signals. For the purpose of this description, assume that VoIP quality speech process 162 is automatically activated in response to the calling party accessing speech recognition system 107.

The present system uses a transmission buffer 141 in the originating device port circuit to store a predetermined and optionally controllable amount of data packets. This system is backwards compatible with existing telephones and the presence of loss in the network. Since existing UDP devices have no transmit buffer, the transmit buffer 141 is located in the port circuit 121 that serves the originating device 111. This system encodes the data received from the originating device 121, stores it in the transmit buffer 141 as it is being output to the network 102. The size of the transmit buffer 141, in systems where buffer space is shared among a plurality of port circuits 121-123, can be controlled by the signals received from the destination device and/or by the network 102. For example, a speech recognition engine 109 can generate a confidence level, which measure can be returned to the originating device 111 to enable the port circuit 121 to allocate buffer resources for the port circuit 121 that serves the originating device. The buffer size can be dynamically adjusted and such a system is backwards compatible with existing systems.

The data output generated by the subscriber terminal device 111 is stored at step 204 in transmit buffer 141 that is part of or associated with the port circuit 121 that serves subscriber terminal device 111. The VoIP quality speech system 162 also signals the Internet Protocol Network 102 at step 205 to transmit the packets of encoded speech using a non-retransmission protocol by using, as one option, the User Datagram Protocol (UDP) implemented on an Internet Protocol Network 102 to minimize the transmission delays. Thus, the Internet Protocol Network 102 processes the received coded signals from the port circuit 121, which coded signals are also stored in transmit buffer circuit 141, without modifying the content of these coded signals or being concerned with the retransmission of lost or damaged packets.

The coded signals are transmitted at step 206 to the destination device, speech recognition system 107, since the receipt and processing of the calling party's speech input need not be done in real time, as long as the quality of the coded speech signals is not degraded by the transmission process.

Activation of the Packet Retransmission Process

When the number and frequency of the transmission errors exceed predetermined limit(s) as determined at step 207 by the speech recognition system 107 (including a threshold where no loss or damage of packets is acceptable), the speech recognition system 107 determines that the signal quality is unacceptable. Speech recognition system 107 accomplishes this in well-known fashion by sequencing the incoming packets appropriately within it's jitter buffer 110 and monitoring the data in the jitter buffer 110, looking for gaps in the sequence of packets (as indicated by their headers) that indicate the absence of packets. When it determines that a packet is missing, the destination system (speech recognition system 107) requests that the originating system retransmit the packet at step 208.

At this juncture, the VoIP quality speech system 142, in response to receipt of a signal indicating excessive errors, can switch to a pseudo TCP/IP transmission mode with regard to the retransmission of missing packets, using the buffer circuit 141 of port circuit 121 at step 209 to provide the speech recognition system 107 with the missing packet(s), each identified by the appropriate header information to enable speech recognition system 107 to reassemble the stream of information. The Internet Protocol Network 102 does not change its mode of operation and continues to transmit the packets of encoded speech using a non-retransmission protocol, such as UDP, to minimize the transmission delays and to not transcode the encoded speech into a lower quality format. The retransmission of packets in this mode is effected by the VoIP quality speech system 142, operating in concert with the speech recognition system 107, in a manner that is transparent to the Internet Protocol Network 102.

Buffer Management Processes

The size of the jitter buffer 110 that is located in speech recognition system 107 is typically selected to avoid interruptions in processing of the received packets. This determination of buffer size would typically include a determination of the amount of time that it takes to identify the loss of a packet and the time that elapses before a requested missing packet can be retransmitted by the VoIP quality speech system 142 and received by the speech recognition system 107. Thus, the speech recognition system 107 may have to adjust how quickly it determines that a packet is missing in the incoming data stream and/or adjust the size of the jitter buffer 110 (which would have the effect of altering the latency).

For example, the speech recognition system 107 determines whether packet loss levels are acceptable, and the extent to which it makes sense to trade latency for reduced packet loss. For example, with TDD/TTY transmissions, and with a packet size of 20 ms, it is known that the FCC-allowable character error rate is exceeded when packet loss exceeds 0.12%. The destination system could therefore adjust the buffer size automatically, such that packet loss would not exceed 0.12%. In a speech recognition or speaker identification application, recognition accuracy and associated "confidence levels" could be the basis for the jitter buffer size adjustments.

The size of the transmit buffer 141, located in the port circuit 121 associated with the originating device 111, can be controlled by the signals received from the destination device and/or by the network. For example, a speech recognition engine 109 can generate a confidence level, which measure can be returned at step 210 to the originating device 111 to enable the port circuit 121 that serves the originating device 111 to dynamically allocate transmit buffer resources. In addition, the packets that are transmitted through network 102 are time stamped and the difference between the present time and the time stamp on a received packet is an indication of the network transmission delay. Thus, the network 102 or the destination device 107 can use this indication to control the size of the transmit buffer 141. The destination device 107 can monitor receipt of packets in the jitter buffer 110 to thereby determine, in advance of the need for the missing packet, to pause the processing of received packets, such as at a rational break in the transmission stream—between words, during pauses, between characters in a TTY transmission, etc. When the need for the high quality speech signals is satisfied and the continuing communications on the call connection can be satisfied by the speed optimized processing of the speech signals, the VoIP quality speech feature can be disabled and the quality speech processing resources released, since the underlying network is by default speed optimized.

Once the need for quality speech transmission has ended, the VoIP quality speech system 142 can return the operation of the system illustrated in FIG. 1 to the default mode of operation. In particular, at step 211, the speech recognition system 103 can transmit an indication that it has concluded the processing of the speech input. In response thereto, the VoIP quality speech system 142 at step 212 terminates the retransmission of lost or damaged packets.

Summary

The VoIP quality speech system is selectively activated when there is a need for quality speech transmission. The VoIP quality speech system can switch to retransmission of missing packets, using the buffer circuit of the originating port circuit to provide the missing packets. The retransmission of packets in this mode is effected by the VoIP quality speech system, operating in concert with the destination, in a manner that is transparent to the Internet Protocol Network.

What is claimed as new and desired to be protected by Letters Patent of the United State is:

1. A system for transmitting quality speech signals in a communication connection from an originating device to a destination device over an IP-based network, comprising:
    a port circuit adapted to transmit data packets, containing encoded speech signals received from an associated originating device, to said destination device via said IP-based network;
    a transmit buffer, connected to said port circuit associated with said originating device, adapted to store a plurality of said data packets received from said associated originating device;
    a network activation controller adapted to activate said IP-based network to operate using a packet transmission protocol that fails to retransmit lost or damaged packets;
    a speech recognition engine adapted to determine that said communication connection serves a speech-based application that requires high quality speech signals;
    a speech recognition system adapted to disable, in response to the conclusion of operation of said speech-based application, operation of a VoIP quality system; and
    the VoIP quality system, operable independent of said packet transmission protocol, adapted to activate said port circuit to retrieve a lost or damaged packet from said transmit buffer for retransmission to said destination device.

2. The system for transmitting quality speech signals of claim 1 wherein said VoIP quality system comprises: a packet error detector, connected to said destination device, adapted to generate an indication that identifies a missing packet; and a transmitter adapted to transmit a signal to said port circuit associated with said originating device requesting retransmission of said identified missing packet.

3. The system for transmitting quality speech signals of claim 1 further comprising: transmit buffer control means for transmitting a signal to said port circuit associated with said originating device to regulate the size of said transmit buffer.

4. The system for transmitting quality speech signals of claim 1 further comprising: a jitter buffer manager adapted to regulate a size of a jitter buffer associated with said destination device as a function of at least one of network transmission delay, speed of processing received packets, time required to identify the absence of a packet in a sequence of received packets, time required to receive a retransmitted packet.

5. The system for transmitting quality speech signals of claim 1 further comprising: a network controller, responsive to the speech recognition engine, adapted to said IP-based transmission medium to transmit said high quality digital encoded speech signals without transcoding.

6. The system for transmitting quality speech signals of claim 1 wherein said speech recognition engine comprises: destination device identifier adapted to determine the presence of a destination device on said communication connection that requires high quality speech signals.

7. The system for transmitting quality speech signals of claim 1 wherein said speech recognition engine comprises: a registration process detector adapted to determine the presence of a subscriber identification process at said destination device.

8. The system for transmitting quality speech signals of claim 7, wherein the speech recognition engine, responsive to the conclusion of operation of said subscriber identification process, is adapted to disable operation of said VoIP quality system.

9. A method for transmitting quality speech signals in a communication connection from an originating device to a destination device over an IP-based transmission medium, comprising:
    transmitting data packets, containing encoded speech signals received from said originating device, from a port circuit serving said originating device to said destination device via said IP-based network;

storing, in a transmit buffer connected to said port circuit, a plurality of said data packets received from said associated originating device;

determining that said communication connection serves a speech-based application that requires high quality speech signals;

activating, in response to said step of determining, said IP-based transmission medium to transmit said high quality digital encoded speech signals without transcoding;

activating said IP-based network to operate using a packet transmission protocol that fails to retransmit lost or damaged packets;

activating, independent of said packet transmission protocol, said port circuit to retrieve a lost or damaged packet from said transmit buffer for retransmission to said destination device; and disabling, in response to the conclusion of operation of said speech-based application, operation of said step of activating said port circuit to retransmit lost or damaged packets.

10. The method for transmitting quality speech signals of claim 9 wherein said step of activating said port circuit comprises: generating an indication that identifies a missing packet; and transmitting a signal to said port circuit associated with said originating device requesting retransmission of said identified missing packet.

11. The method for transmitting quality speech signals of claim 9 further comprising: transmitting a signal to said port circuit associated with said originating device to regulate the size of said transmit buffer.

12. The method for transmitting quality speech signals of claim 9 further comprising: regulating a size of a jitter buffer associated with said destination device as a function of at least one of: network transmission delay, speed of processing received packets, time required to identify the absence of a packet in a sequence of received packets, time required to receive a retransmitted packet.

13. The method for transmitting quality speech signals of claim 9 wherein said step of determining comprises: determining the presence of a destination device on said communication connection that requires high quality speech signals.

14. The method for transmitting quality speech signals of claim 9 wherein said step of determining comprises: determining the presence of a subscriber identification process at said destination device.

15. The method for transmitting quality speech signals of claim 14 further comprising: disabling, in response to the conclusion of operation of said subscriber identification process, operation of said step of activating said port circuit to retransmit lost or damaged packets.

* * * * *